2 Sheets--Sheet 1.

E. P. WHEELER.
Registers and Indicators.

No. 143,651. Patented Oct. 14, 1873.

Witnesses
G. J. Ferriss
Wm. E. Chaffee

Inventor.
Edward P. Wheeler

2 Sheets--Sheet 2.

E. P. WHEELER.
Registers and Indicators.

No. 143,651. Patented Oct. 14, 1873.

Witnesses  
G. J. Ferriss  
Wm. E. Chaffee

Inventor  
Edward P. Wheeler

UNITED STATES PATENT OFFICE.

EDWARD P. WHEELER, OF CORINTH, MISSISSIPPI.

IMPROVEMENT IN REGISTERS AND INDICATORS.

Specification forming part of Letters Patent No. 143,651, dated October 14, 1873; application filed September 25, 1873.

*To all whom it may concern:*

Be it known that I, EDWARD P. WHEELER, of Corinth, in the county of Alcorn and State of Mississippi, have invented certain new and useful Improvements in Indicator and Register; and I do hereby declare the following to be a full, clear, and exact description of the invention, such as will enable others skilled in the art to which it pertains to make and use it, reference being had to the accompanying drawings, which form part of this specification:

The nature of my invention consists in the construction and arrangement of an indicator or register, to be attached to railroad-cars, vehicles, or machinery of any description, for the purpose of showing at any and all times the numbers, or the exact distance traveled, as will be hereinafter more fully set forth.

In order to enable others skilled in the art to which my invention appertains to make and use the same, I will now proceed to describe its construction and operation, referring to the annexed drawings, in which—

Figure 1:
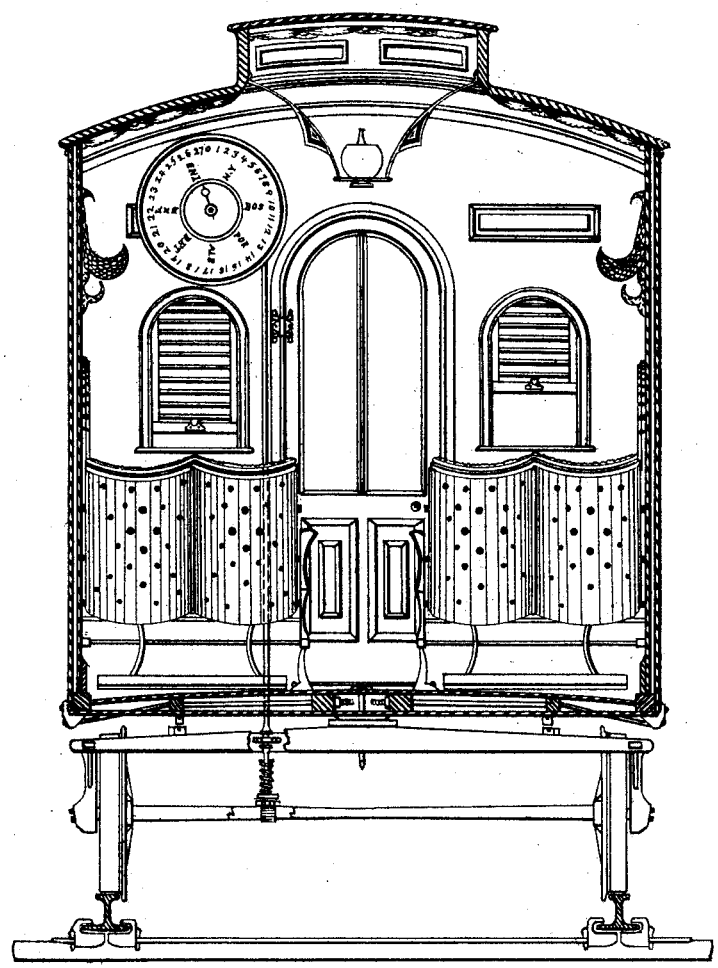
Figure 2:
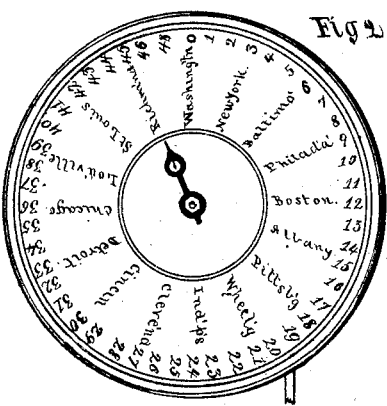
Figure 3:
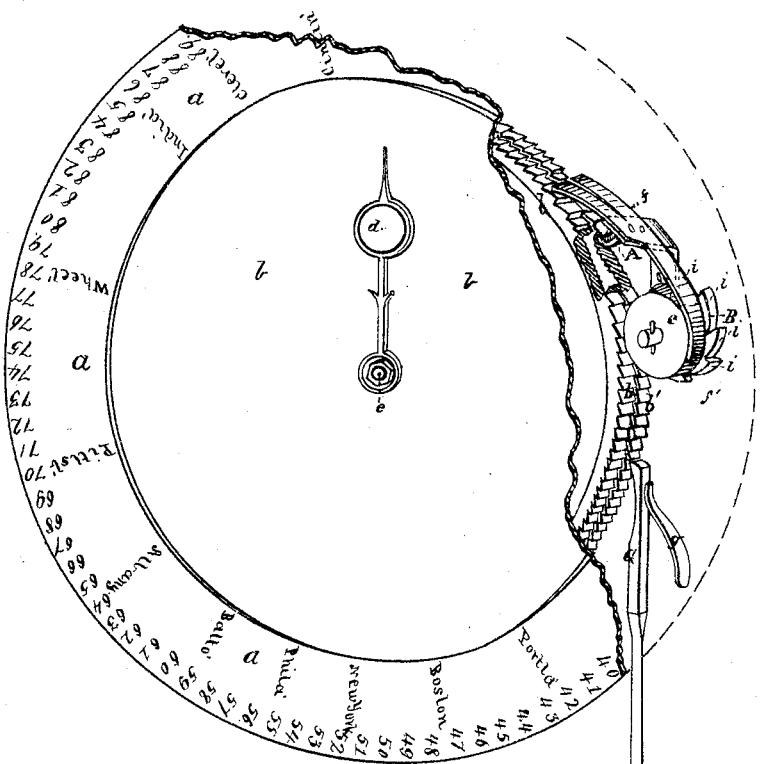
Figure 3:
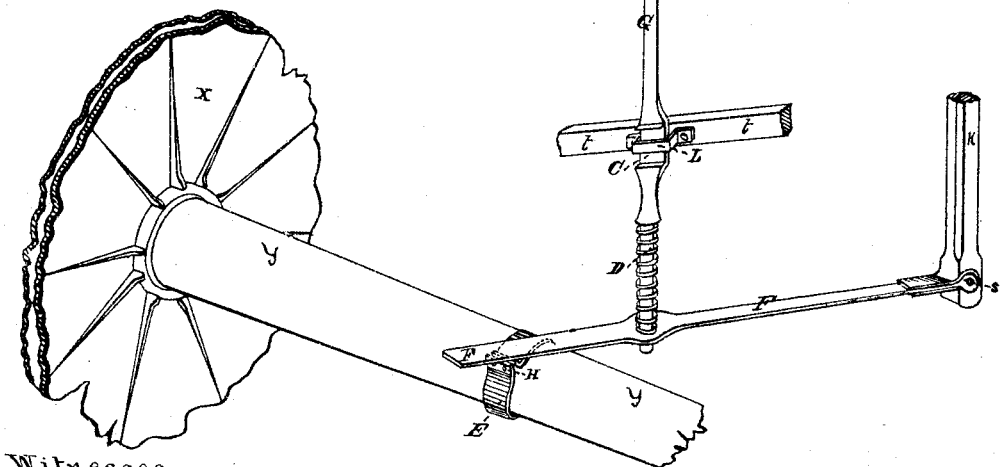

Figure 1 is a transverse vertical section of a railroad-car, showing my indicator or register in position in the end thereof. Fig. 2 is an enlarged front view of the dial-plate; and Fig. 3 is an enlarged perspective view of the working mechanism of the indicator.

$b$ $b'$ represent two large wheels placed side by side upon a shaft, $e$, which has its bearings in a suitable case, said case being on the front provided with a dial-plate, $a$, and the shaft $e$, having a hand or finger, $d$, placed on its front end, to point on said dial-plate. Both of the wheels $b$ $b'$ are provided with a large number of teeth, as shown in Fig. 3, and the wheel $b'$ has, in addition thereto, on its inner side, a single tooth or pin, A. This tooth or pin A is so arranged that it will once, during each revolution of the wheel $b'$, catch on one of the teeth $i$ of a smaller wheel, $c$, placed to one side of the wheels $b$ $b'$. The wheel $c$ is of the same thickness as the two wheels $b$ $b'$, and its teeth $i$ $i$ are so placed that only the tooth A of the wheel $b'$ will touch the same and turn the wheel $c$. This wheel is further provided with a single tooth, B, so arranged that once during each revolution of the wheel $c$ it will strike a tooth on the wheel $b$, and turn the same the distance of just one tooth. $f$ represents a spring, made of a steel plate, and fastened to a post on the case inclosing the mechanism. One end of this spring wraps partly around the smooth portion of the wheel $c$, to hold the same by friction from turning, except when and so long as operated by the tooth A. The other end of the spring $f$ is split or forked, one part engaging with each of the toothed wheels $b$ and $b'$. The wheel $b'$ is revolved the distance of one tooth at a time by means of a lever, G, which passes through suitable guides attached to the framework of the car, and the upper end of which is pressed against the toothed wheel $b'$ by a spring, $g$. The lower end of the lever G is attached to an arm, F, one end of which is hinged to the frame-work of the car, and the other end passes over the car-axle $y$. On the axle $y$ is attached a band, E, with an arm or projection, H, on one side, which operates the arm F in such a manner as to raise its free end once during each revolution of the car-axle. This upward movement of the arm F raises the lever G sufficient to cause it to turn the wheel $b'$ the distance of one tooth. As soon as the projection H has cleared the arm F, the lever G falls back to its original position by its own weight. A spring, D, is arranged around the lower end of lever G, for the purpose of raising lever G, and to allow arm F to pass higher without raising lever G by any oscillating motion.

The circumference of the car-wheels $x$ being known, say ten feet, the car moves just this distance for each movement of the wheel $b'$. This wheel having, say, one hundred teeth, the car will have moved one thousand feet when the wheel $b'$ completes one revolution. Then the wheel $c$, having, say, six teeth, $i$ $i$, it follows that the car will have moved six thousand feet when the wheel $c$ completes one revolution and turns the wheel $b$ the distance of one tooth. This distance of six thousand feet is then shown upon the dial-plate $a$ by the hand $d$, said hand being so arranged as to turn with the wheel $b$.

The above figures are merely for an illustration. In practice on railroad-cars, the mechanism should be so arranged that the hand $d$ will move at the completion of every mile. The stations, as well as the number of miles, being marked on the dial-plate, my indicator or register will not only show the distance traveled, but also the names of the stations as the car arrives at each.

The same device is equally applicable to carriages, vehicles, or machinery of any description, for the purpose of measuring distances and numbers.

The lever G has a guide, t, and strap L, and the part C' of the arm or lever is notched, so that the movement of the lever is limited to the distance between the notches, while the arm F should be slotted, in order to compensate for lost motion when the car or vehicle cants to one side or the other, while the spring D will allow arm F to pass higher without raising lever G.

Having thus fully described my invention, what I claim as new, and desire to secure by Letters Patent, is—

1. The combination, with the ratchet-wheels b b' and c, of a register for cars, vehicles, and other purposes, rod G, having a limited motion, and lever F, through which said rod projects, supported by spring D, as described, and for the purpose hereinbefore set forth.

2. The combination, with rod G, having limited motion, of spring D, lever F, and collar E, substantially as and for the purpose set forth.

In testimony that I claim the foregoing, I have hereunto set my hand this 5th day of September, 1873.

EDWARD P. WHEELER.

Witnesses:
BENJAMIN N. MEEDS,
G. J. FERRISS.